(12) United States Patent
Sreesha

(10) Patent No.: US 9,544,296 B2
(45) Date of Patent: Jan. 10, 2017

(54) TRANSFERRING WEB-APPLICATION PREREQUISITE FILES WHILE AUTHENTICATION INTERFACE OCCLUDES WEB-APPLICATION INTERFACE

(71) Applicant: Sreenidhi Sreesha, Sunnyvale, CA (US)

(72) Inventor: Sreenidhi Sreesha, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 66 days.

(21) Appl. No.: 14/594,961

(22) Filed: Jan. 12, 2015

(65) Prior Publication Data

US 2016/0205088 A1  Jul. 14, 2016

(51) Int. Cl.
| G06F 7/04 | (2006.01) |
| G06F 15/16 | (2006.01) |
| G06F 17/30 | (2006.01) |
| H04L 29/06 | (2006.01) |
| H04L 29/08 | (2006.01) |

(52) U.S. Cl.
CPC ........... H04L 63/0815 (2013.01); H04L 67/02 (2013.01); H04L 67/06 (2013.01)

(58) Field of Classification Search
CPC .... H04L 63/0815; H04L 63/08; H04L 63/083; G06F 21/41; H04W 12/06
USPC .......................................................... 726/8
See application file for complete search history.

(56) References Cited

U.S. PATENT DOCUMENTS

| 7,386,539 | B2* | 6/2008 | Hung ................ G06F 17/30864 |
| | | | 707/695 |
| 8,095,972 | B1 | 1/2012 | Floyd et al. |
| 8,763,102 | B2 | 6/2014 | Furman et al. |
| 2004/0107214 | A1* | 6/2004 | Hung ................ G06F 17/30864 |
| 2011/0307940 | A1 | 12/2011 | Wong |
| 2014/0304794 | A1 | 10/2014 | Gargaro et al. |
| 2015/0082321 | A1* | 3/2015 | Mikles .................... G06F 9/546 |
| | | | 719/313 |
| 2015/0082323 | A1* | 3/2015 | Mikles .................... G06F 9/546 |
| | | | 719/313 |

* cited by examiner

*Primary Examiner* — Kambiz Zand
*Assistant Examiner* — Stephen Sanders

(57) ABSTRACT

A web browser sends to a web-application server a request to access a web application. The web server transmits to the web browser a parent document with an inline frame (iframe) containing a Uniform Resource Locator (URL) to an authentication location. In response, a child document is transferred to the web browser. The child document occludes the parent document and presents a user interface for user authentication. Rather than wait until authentication is complete to begin transferring prerequisite files, the web-application server at least partially transfers to the web browser prerequisite files for the web application during the authentication process. This reduces the post-authentication delay involved in transferring prerequisite files, improving the user experience.

16 Claims, 3 Drawing Sheets

TRANSFERRING WEB-APPLICATION PREREQUISITE FILES WHILE AUTHENTICATION INTERFACE OCCLUDES WEB-APPLICATION INTERFACE

BACKGROUND

Web applications are applications accessed over a network using a web browser. E-mail, social media sites, online retail sites, and online banking are familiar examples of online applications. Many online applications require user authentication, i.e., a determination that a user accessing an online application is who the user purports to be. For example, a password, a certificate, a verifiable contact address (e.g., email address or cell phone number), or a combination of such identifiers, can be used to authenticate a user.

In some cases, an authentication procedure can be built into an application. In other cases, the authentication procedure can exist independently of the application. For example, rather than require separate authentications for each of a suite of web applications, the web applications can share a single-sign-on (SSC)) procedure so that a user authenticated for one web application can use the others without additional authentication procedures. Once a user is authenticated and all the prerequisite files, if any, for a web application have been transferred, the user can use the web application.

DETAILED DESCRIPTION

Some web applications require transferring of prerequisite files before a user can begin to use the web application. For example, in the case of a web application (e.g., based on Adobe Flash, Oracle JAVA, or Microsoft Active X) a number of runtime libraries may have to be transferred before the user can use the web application. The present invention provides a way for a web-application server to transfer prerequisite files while a separate authentication server handles authentication. Since transferring of prerequisite files begins before rather than after authentication is completed, the delay between the time a user is authenticated and the time the user can actually use the web application is reduced, enhancing the user experience.

Figure 1:
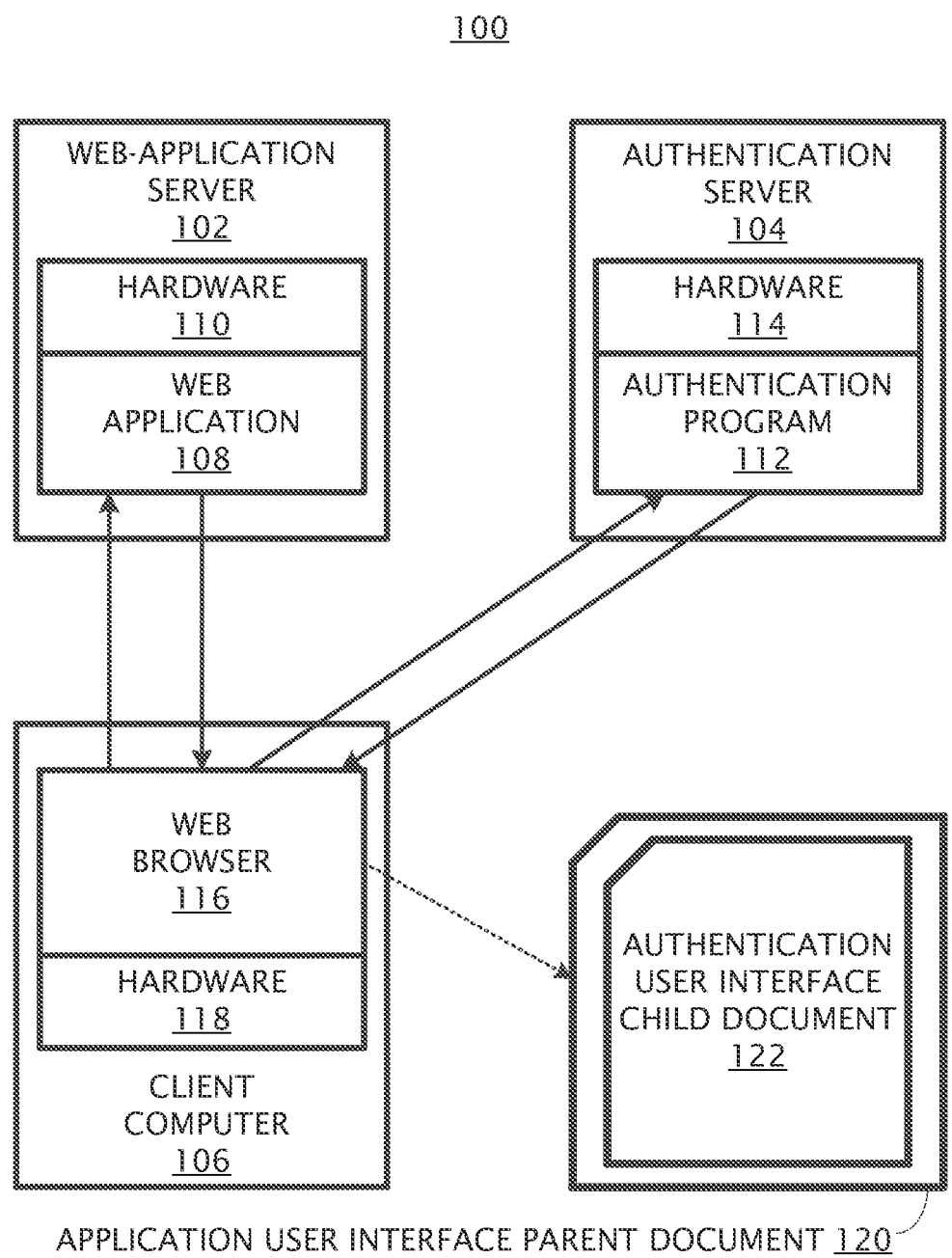
FIG. 1 is a schematic diagram of a web-application system in accordance with the present invention.

As shown in FIG. 1, a web-application system 100 includes a web-application server 102, an authentication server 104, and a client computer 106. Web-application server 102 includes a web application 108 and hardware 110 for executing a server-side portion of web application 108. Hardware 110 can include one or more processors, communications devices, and non-transitory storage media encoded with code defining web application 108 and associated software including an operating-system instance and a file server. Web-application server 102 may be referred to as a "web-application stack" as it includes the server-side portion of a web application and all the software and hardware required to run the server-side portion of the web application. Depending on the embodiment, a web-application server can include a portion of a physical computer, an entire physical computer, or plural physical computers.

Authentication server 104 includes an authentication program 112 and hardware 114. Hardware 114 can include processors, communications devices, and non-transitory storage media encoded with code defining authentication program 112 and an operating system. Authentication server 104 can serve as an "authentication stack" as it includes an authentication. program and all the software and hardware required for a server-side portion of the authentication program to execute.

Client computer 106 includes a web browser 116 and hardware 118 on which the web browser can execute. Hardware 118 can include one or more processors, communications devices, and non-transitory media encoded with code defining web browser 116 and other software (e.g., an operating-system instance) on which web browser 116 executes. Client computer 106 serves as a browser stack including a web browser, an operating-system instance on which the web browser runs, and the hardware on which the operating system runs.

Figure 2:
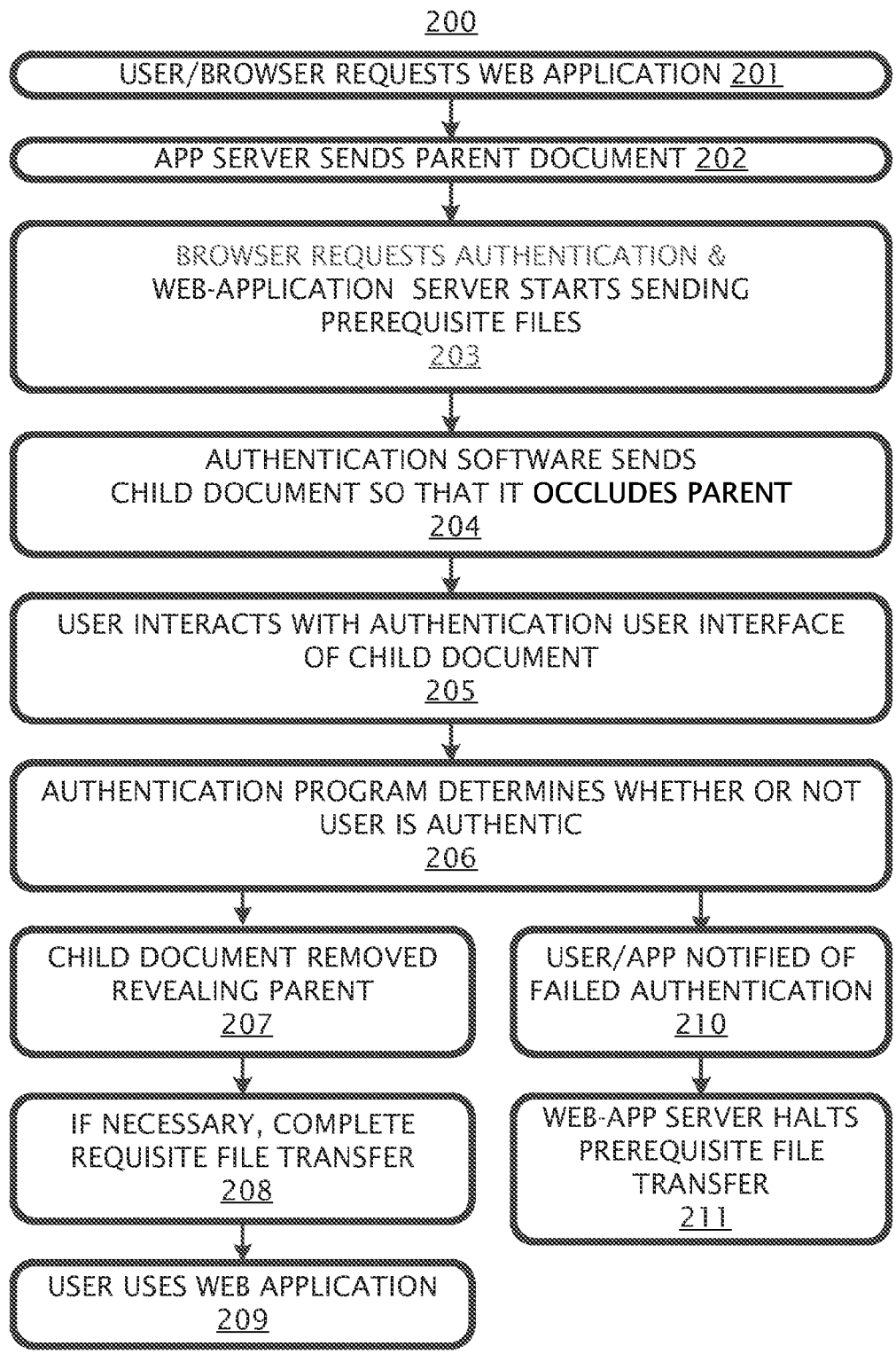
FIG. 2 is a flow chart of a process in accordance with the present invention.

A user-authentication process 200, implementable on web-application system 100 and other systems, is flow charted in FIG. 2. At 201, a user, using a web browser executing on a client computer, transmits a request to access a web application. The request can be made to a web-application server. In an alternative embodiment, the request is made to an authentication server.

At 202, the web-application server transfers, to a browser executing on a client computer, a parent document, such as document 120 in FIG. 1. The parent document may serve, when loaded, as a user interface for the web application and may serve other purposes as well. The parent document may specify a location to which an authentication request may be sent. For example, the parent document may include an iframe specifying a Uniform Resource Locator (URL). Herein, an "iframe" is an inline frame that can contain its own request, e.g., an authentication. request, in the illustrated embodiment, the authentication location is associated with the authentication server, to which the authentication request is sent. However, in an alternative embodiment, the authentication location is associated with the web-application server, which redirects the authentication request to the authentication server.

At 203, the browser sends an authentication request to the location specified in the parent document and the web-application server starts sending prerequisite files to the browser. During authentication, the web-application server transfers to the web browser at least some portion of the rerequisite files, e.g. run-time modules, for the web application. This transferring can begin at the time the parent document is sent or any time after through authentication. The transfer of prerequisite files may finish before authentication is complete or continue past authentication.

At 204, the authentication server transfers a child document to the web browser. The child document can occlude, i.e., block, the parent document, as shown for child document 122 in FIG. 1. The occlusion can be partial or total; in either case, the user is prevented from interacting with the parent document while the child document is occluding it. The child document can include a user interface for authentication.

At 205, the user interacts with the authentication (child) document, for example, entering a user name, a password, and/or credentials. The interaction can include an action causing the authentication information to be uploaded to the authentication server. At 206, a determination is made whether or not the user is authenticated.

If at 206, the user is authenticated, then, at 207, the child document is removed, revealing the parent document. If, by this time, the web-application prerequisites have not completed transferring, the transferring of prerequisite files is completed at 208. At 209, the user uses the web application by interacting with the parent page.

If at 206, the authentication fails, then, at 210, the user is informed that authentication has failed. In an embodiment, the web-application server is also informed of the authentication failure so that it can halt transferring of prerequisite files prior to completion at 211. However, in web-application system 100, the authentication server does not inform the web-application server directly of the authentication results as the user may retry authentication.

Figure 3:
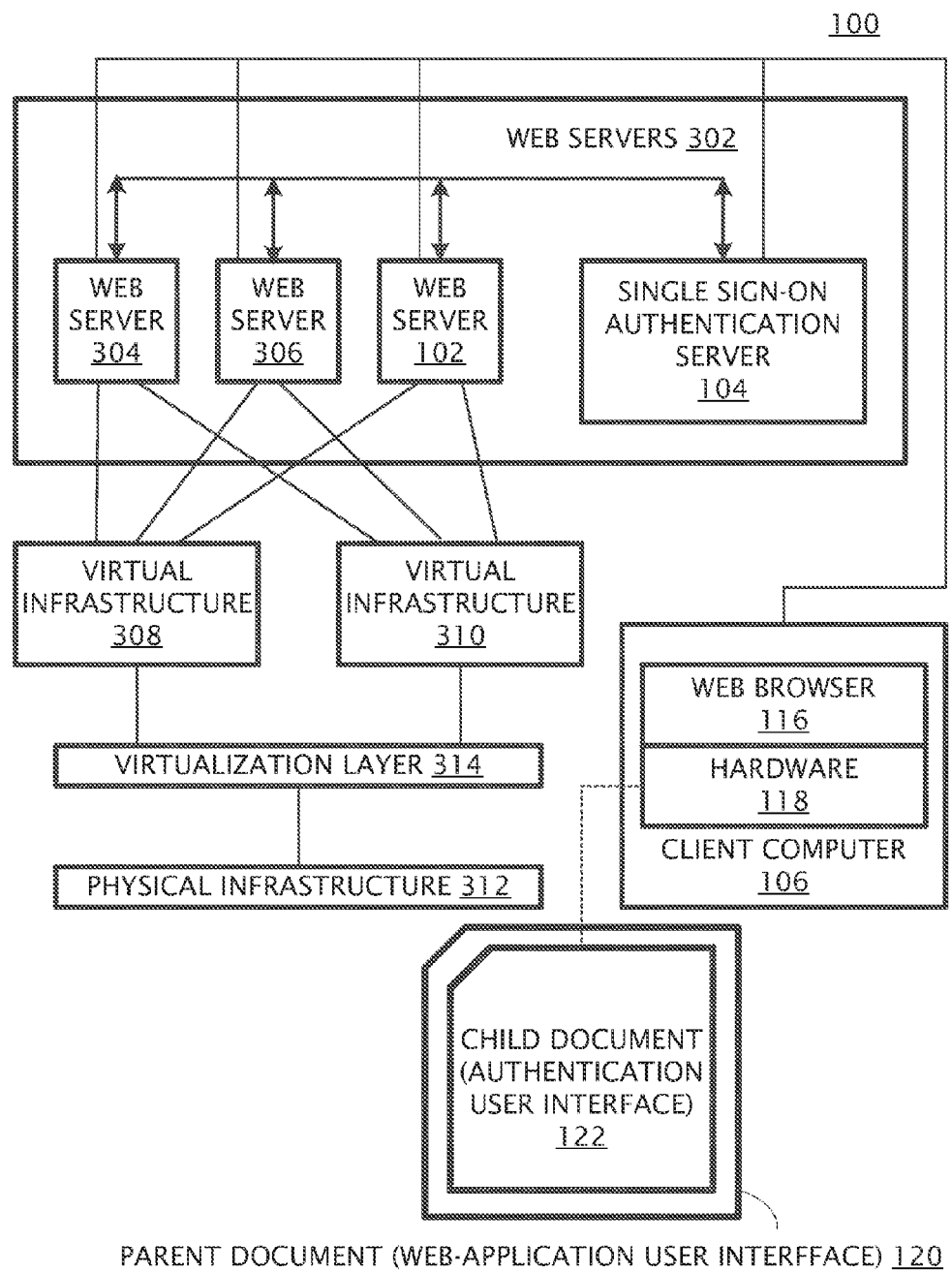
FIG. 3 is a more detailed schematic diagram of the web-application system of FIG. 1.

More of the context of web-application system 100 is shown in FIG. 3. Web-application server 102 and authentication server 104 belong to a network of web servers 302 that also includes other web servers. The other web servers include web-application servers 304 and 306 that serve different ones of a suite of web applications for using and managing virtual infrastructures, including virtual infrastructures 308 and 310. A virtualization layer 312 virtualizes a physical infrastructure 314 to generate the virtual infrastructures.

The virtual infrastructures may be used and managed by different entities, e.g., different customers of a cloud-services entity that owns and manages physical infrastructure 314. Each customer interfaces with its own virtual infrastructure without regard to coexisting virtual infrastructures. The cloud-services entity provisions and manages physical infrastructure 314 and virtualization layer 312.

For example, web application 108 (FIG. 1) may be vSphere, available from VMware Inc., for managing virtual infrastructures, e.g., reconfiguring virtual servers and networks. Users, accessing vSphere on web-application server 102 can manage their respective virtual infrastructures. Web-application system 100 uses the authentication process to match a user making a request to the virtual infrastructure the user is authorized to manage.

A user attempting to use web application 108 is authenticated using single-sign-on (SSO) authentication server 104. Once a user is authenticated, the user is then also authenticated for using different web applications, e.g., executing on. web-application. servers 304 and 306 without further authentication. Such a single-sign-on context is one reason an authentication process would be independent from the web application for which authentication is required.

The present invention provides for alternative types of communications between a web-application server and an authentication server. In the illustrated embodiment, the web-application server forwards an authentication request to the authentication server, and the authentication server informs the web-application server of the authentication results. When the web application is informed that the authentication has failed, the web-application server can halt transferring of the prerequisite files. Alternatively, there may be no direct notification of authentication results from the authentication server to the web-application server; in which case, transferring of prerequisite files may not be halted, but the user cannot use the web application as the parent document continues to be occluded by the child document. In an embodiment in which the URL in the iframe specifies a location associated with the authentication server (instead of being associated with the web-application server), the authentication server can notify the web-application server that the request for authentication has been received.

In an embodiment in which a user first accesses the authentication server, the authentication server can speculate as to the web application to be accessed based on a user's profile or history. The authentication server can then notify the respective web-application server to begin transferring prerequisite files.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation.

Herein, "process container" encompasses process containers running on the same operating-system instance and process containers running on separate operating-system instances. Typically, processes executing in the same process container may communicate directly with each other, whereas processes executing in separate process containers, if communication is possible at all, must communicate through controlled channels. Herein, the browser, the authentication program, and the web application. execute in separate process containers.

Herein, a "stack" is a combination of a mission program (e.g., a web application), any hardware required to execute the application, and any additional software (e.g., an operating system) required to execute the application. For an application running on a virtual machine, the stack would include the application, the guest operating system (OS), the virtualizing-host OS, and the hardware on which the host OS executes.

"Occlude" herein means "to block a view so as to obstruct user interaction with". The blocking can be such that the occluded object is not visible at all or such that the occluded object is partially visible. In either case, user interaction with the occluded object is obstructed in some way. For an object to be occluded, it must be present, e.g., defined by code to exist in a given location over which the occluding object is defined.

In this Specification, related art is discussed for expository purposes. Related art labeled "prior art", if any, is admitted prior art. Related art not labeled "prior art" is not admitted prior art. In addition to the examples presented herein, other variations upon and modifications to the illustrated. embodiments are within the scope of the following claims.

What is claimed is:

1. A process comprising:
  a user using a web browser executing on a client computer to transmit to a web-application server an access request to use a web application hosted by the web-application server, the web application having associated prerequisite files;
  the web-application server responding to the access request by transmitting to the web browser a parent document, the parent document identifying an authentication location;
  the web browser transmitting an authentication request to the authentication location;
  in response to the authentication request, an authentication program executing on an authentication server transmitting to the web browser a child document, the child document at least partially occluding the parent document, the child document presenting an authentication user interface;

the authentication program making an authentication determination whether or not the user is authenticated based at least in part on the user's interaction with the authentication user interface;

the web-application server, after a time the child document is transmitted and before a time the authentication determination is made, at least partially transferring the prerequisite files to the web browser; and in response to authentication, removing the child document so that the parent document is no longer occluded by the child document.

2. The process of claim 1 wherein the parent document includes an inline frame (iframe), which includes a Uniform Resource Locator (URL), wherein the identifying of the authentication location is based on the URL.

3. The process of claim 2 wherein the URL identifies a location associated with the authentication server.

4. The process of claim 2 wherein the URL identifies a location associated with the web-application server.

5. The process of claim 4 further comprising, the web-application server redirecting the authentication request to the authentication server.

6. A system comprising:
a web-application server, the web-application server including a web application and hardware for executing at least part of the web application, the web-application server being executable so as to respond to an access request from a web browser to use the web application by transmitting to the web browser a parent document, the parent document including authentication information enabling access to an authentication procedure for authenticating a user of the web browser, the web-application server providing for at least partially transferring, to the web browser and during user authentication, prerequisite files required for using the web application; and an authentication server, the authentication server including an authentication program and authentication hardware for executing the authentication program, the authentication program being executable so as to transmit to the web browser a child document that occludes the parent document while the user is interacting with the child document and that is removed upon authentication to reveal the parent document, the revealed parent document allowing the user to use the web application once the prerequisite files have been transferred to the web browser.

7. The system of claim 6 wherein the web application and the authentication program either:
execute in separate process containers executing on the same operating-system instance; or
execute on different operating-system instances.

8. The system of claim 6 wherein the authentication information includes a Uniform Resource Locator (URL) identifying a location associated with the web-application server or associated with the authentication server.

9. The system of claim 8 wherein the parent document includes an inline frame (iframe) that includes the URL.

10. The system of claim 6 further comprising other servers that include web applications, the other servers being separate from the web-application server, the authentication program being a single-sign-on (SSO) authentication program shared by the web-application server and the other servers.

11. A system including non-transitory media encoded with code that, when executed using hardware, causes the hardware to implement a process including:
a web-application server responding to an access request from a web browser by transmitting to the web browser a parent document, the parent document identifying an authentication location, the access request being a request to use a web application executing on the web-application server, the web application having associated prerequisite files that are to be transferred to the web browser so that the user can use the web application;

the web browser transmitting an authentication request to the authentication location;

in response to the authentication request, an authentication program transmitting to the web browser a child document, the child document at least partially occluding the parent document, the child document presenting an authentication user interface;

the authentication program making an authentication determination whether or not the user is authenticated based at least in part on the user's interaction with the authentication user interface;

the web application, after a time the child document is transmitted and before a time the authentication determination is made, at least partially transferring the prerequisite files; and in the event the user is authenticated, causing the child document to be removed so that the parent document is no longer occluded by the child document so that the user can use the web application once the prerequisite files have been transferred.

12. The system of claim 11 wherein the parent document includes an inline frame (iframe), which includes a Uniform Resource Locator (URL).

13. The system of claim 12 wherein the URL identifies a location of the authentication program.

14. The system of claim 12 wherein the URL identifies a location associated with the web application.

15. The system of claim 14 wherein the process further includes the web application redirecting the authentication request to the authentication program.

16. The system of claim 11 further comprising the hardware.

* * * * *